United States Patent [19]
Dulong

[11] Patent Number: 5,752,001
[45] Date of Patent: May 12, 1998

[54] METHOD AND APPARATUS EMPLOYING VITERBI SCORING USING SIMD INSTRUCTIONS FOR DATA RECOGNITION

[75] Inventor: Carole Dulong, Saratoga, Calif.

[73] Assignee: Intel Corporation, Santa Clara, Calif.

[21] Appl. No.: 457,102

[22] Filed: Jun. 1, 1995

[51] Int. Cl.$^6$ ........................................... G06F 15/00
[52] U.S. Cl. .................. 395/500; 395/2.49; 395/2.51; 395/2.55
[58] Field of Search ........................... 395/500, 2.49, 395/2.51, 2.53, 2.4, 2.65, 2.55; 364/728.01; 382/218; 381/43; 235/174

[56] References Cited

U.S. PATENT DOCUMENTS

| | | | |
|---|---|---|---|
| 3,711,692 | 1/1973 | Batcher | 364/715.09 |
| 3,723,715 | 3/1973 | Chen et al. | 364/786.04 |
| 4,001,570 | 1/1977 | Gooding et al. | 364/771 |
| 4,161,784 | 7/1979 | Cushing et al. | 364/748.19 |
| 4,393,468 | 7/1983 | New | 364/749 |
| 4,418,383 | 11/1983 | Doyle et al. | 395/307 |
| 4,498,177 | 2/1985 | Larson | 371/52 |
| 4,587,670 | 5/1986 | Levinson et al. | 395/2.65 |
| 4,707,800 | 11/1987 | Montrone et al. | 364/788 |
| 4,771,379 | 9/1988 | Ando et al. | 395/800.42 |
| 4,989,168 | 1/1991 | Kuroda et al. | 364/715.09 |
| 5,095,457 | 3/1992 | Jeong | 364/758 |
| 5,187,679 | 2/1993 | Vassiliadis | 364/786.01 |
| 5,459,798 | 10/1995 | Bailey et al. | 382/218 |
| 5,530,661 | 6/1996 | Garbe et al. | 364/728.01 |

OTHER PUBLICATIONS

Kai Hwang, "Advanced Computer Architecture, Parallelism, Scalability, Programming." p. 448.
Kai Hwang "Advanced Computer Architecture, Parallelism, Scalability, Programming." p. 31.
Microsoft Press "Computer Dictionary." Second Edition, 1993, p. 251.

*MC88110 Second Generation RISC Microprocessor User's Manual*, Motorola Inc. (1991).
*i860™ Microprocessor Family Programmer's Reference Manual*, Intel Corporation (1992), Ch. 1, 3, 8, 12.
R. B. Lee, *Accelerating Multimedia With Enhanced Microprocessors*, IEEE Micro (Apr. 1995), pp. 22–32.
N. Margulis, *i860 Microprocessor Architecture*, McGraw Hill, Inc. (1990) Ch. 6, 7, 8, 10, 11.
*Pentium Processor User's Manual, vol. 3: Architecture and Programming Manual*, Intel Corporation (1993), Ch. 1,3,4, 6,8, and 18.
J. Shipnes, *Graphics Processing with the 88110 RISC Microprocessor*, IEEE, pp. 169–174 (1992).
*MC88110 Second Generation RISC Microprocessor User's Manual*, Motorola Inc., 1991.
*Errata to MC88110 Second RISC Microprocessor User's Manual*, Motorola Inc. 1992, pp. 1–11.

(List continued on next page.)

Primary Examiner—Kevin J. Teska
Assistant Examiner—Vuthe Siek
Attorney, Agent, or Firm—Charles Young

[57] ABSTRACT

A computer system includes a single instruction multiple data (SIMD) instruction set. At a first observation time, a first SIMD instruction is used to determine a first plurality of probabilities for the stochastic model to be in a certain set of states after transitioning via a first set of transitions. A second SIMD instruction is used to determine a second plurality of probabilities for the stochastic model to be in the same set of states after transitioning via a second set of transitions. A third SIMD instruction is used to compare the results of the first two SIMD instructions to determine a set of intermediate probabilities. Another SIMD instruction adds a set of distribution probabilities to the set of intermediate probabilities. A new way of organizing the distribution probabilities in memory enables use of the SIMD instructions. The steps are repeated for other observation times to determine a final probability of a multimedia observation matching a multimedia stochastic model.

21 Claims, 6 Drawing Sheets

OTHER PUBLICATIONS

*MC88110 Programmer's Reference Guide*, Motorola Inc., 1992. pp. 1–4.

*i860™ Microprocessor Family Programmer's Reference Manual*, Intel, 1992. pp. 8–1 through 8–39.

B. Case, Philips Hopes to Displace DSPs with VLIW, *Microprocessor Report*, Dec. 94, pp. 12–18.

*TMS320C2x User's Guide, Texas Instruments*, 1993, pp. 3–2 through 3–11; 3–28 through 3–34; 4–1 through 4–22; 4–41; 4–103; 4–119 through 4–120; 4–122; 4–150 through 4–151.

L. Gwennap, New PA–48SC Processor Decodes MPEG Video, Microprocessor Report, Jan. 1994, pp. 16 & 17.

SPARC Technology Business, *UltraSPARC Multimedia Capabilities On–Chip Support for Real–Time Video and Advanced Graphics*, Sun Microsystems, Sep. 1994.

Kawakami et al., LSI Applications: *A Single–Chip Digital Signal Processor for Voiceband Applications*, Solid State Circuits Conference, Digest of Technical Papers; IEEE International, 1980.

Alex Waibel, Kai–Fu Lee, *Readings in Speech Recognition*, Morgan Kaufman Publishers, Inc., San Mateo, California, 1990, pp. 263–370.

PACKED ADDITION OPERATION

| | | | | | | | SOURCE 1 |
|---|---|---|---|---|---|---|---|
| 00101010 | 01010101 | 01010101 | 11111111 | 10000000 | 01110000 | 10001111 | 10001000 |
| + 7 | + 6 | + 5 | + 4 | + 3 | + 2 | + 1 | + 0 |
| | | | | | | | SOURCE 2 |
| 10101010 | 01010101 | 10101010 | 10000001 | 10000000 | 11110000 | 11001111 | 10001000 |
| = 7 | = 6 | = 5 | = 4 | = 3 | = 2 | = 1 | = 0 |
| | | | | | | | RESULT |
| 11010100 | 10101010 | 11111111 | OVERFLOW | OVERFLOW | OVERFLOW | OVERFLOW | OVERFLOW |
| 7 | 6 | 5 | 4 | 3 | 2 | 1 | 0 |

FIG. 4

PACKED MULTIPLY UNSIGNED HIGH

| 11111111  11111111 | 11111111  00000000 | 11111111  00000000 | 00001110  00001000 |
|---|---|---|---|
| MULTIPLY  3 | MULTIPLY  2 | MULTIPLY  1 | MULTIPLY  0 |
| 00000000  00000000 | 00000000  00000001 | 10000000  00000000 | 00001110  10000001 |
| = | = | = | = |
| 00000000  00000000 | 00000000  00000000 | 01111111  10000000 | 00000000  11001011 |
| 3 | 2 | 1 | 0 |

FIG. 5

SHIFT (PACKED SHIFT RIGHT ARITHMETIC)

| 00101010 | 01010101 | 01010101 | 11111111 | 10000000 | 01110000 | 10001111 | 10001000 |
|---|---|---|---|---|---|---|---|
| SHIFT 7 | SHIFT 6 | SHIFT 5 | SHIFT 4 | SHIFT 3 | SHIFT 2 | SHIFT 1 | SHIFT 0 |
| 00000000 | 00000000 | 00000000 | 00000000 | 00000000 | 00000000 | 00000000 | 00000100 |
| = | = | = | = | = | = | = | = |
| 00000010 | 00000101 | 00000101 | 11111111 | 11111000 | 00000111 | 11111000 | 11111000 |
| 7 | 6 | 5 | 4 | 3 | 2 | 1 | 0 |

FIG. 6

PACKED MULTIPLY-ADD (SIGNED)

| 11111111 11111111 | 11111111 00000000 | 01110001 11000111 | 01110001 11000111 |
|---|---|---|---|
| MULTIPLY 3 | MULTIPLY 2 | MULTIPLY 1 | MULTIPLY 0 |
| 00000000 00000000 | 00000000 00000001 | 10000000 00000000 | 00000100 00000000 |
| = | = | = | = |
| 32-BIT INTERMEDIATE RESULT 4 | 32-BIT INTERMEDIATE RESULT 3 | 32-BIT INTERMEDIATE RESULT 2 | 32-BIT INTERMEDIATE RESULT 1 |
| ADD || ADD ||
| 11111111 11111111 | 11111111 00000000 | 11001000 11100011 | 10011100 00000000 |
| 1 || 0 ||

FIG. 7

PACKED COMPARE FOR GREATER THAN (SIGNED)

| 00101010 | 01010101 | 01010101 | 11111111 | 10000000 | 01110000 | 10001111 | 10001000 |
|---|---|---|---|---|---|---|---|
| > 7 | > 6 | > 5 | > 4 | > 3 | > 2 | > 1 | > 0 |
| 00000000 | 00000000 | 10000000 | 00000000 | 11110011 | 00000000 | 10001110 | 10001000 |
| = | = | = | = | = | = | = | = |
| 11111111 | 11111111 | 11111111 | 00000000 | 00000000 | 11111111 | 00000000 | 00000000 |
| 7 | 6 | 5 | 4 | 3 | 2 | 1 | 0 |

FIG. 8

LOGICAL ANDNOT

| 11111111 11111111 | 11111111 00000000 | 11111111 00000000 | 00001110 00001000 |
|---|---|---|---|
| LOGICAL ANDN 3 | LOGICAL ANDN 2 | LOGICAL ANDN 1 | LOGICAL ANDN 0 |
| 00000000 00000000 | 00000000 00000001 | 10000000 00000000 | 00001110 10000001 |
| = | = | = | = |
| 00000000 00000000 | 00000000 00000001 | 00000000 00000000 | 00000000 10000001 |
| 3 | 2 | 1 | 0 |

METHOD AND APPARATUS EMPLOYING VITERBI SCORING USING SIMD INSTRUCTIONS FOR DATA RECOGNITION

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

BACKGROUND OF THE INVENTION

1. Field of the Invention

The described invention relates to the field of data recognition using stochastic modeling. Specifically, the described invention relates to the use of a Single Instruction/Multiple Data (SIMD) computing system for determining the highest probability that a certain data observation corresponds to a stochastic model using Viterbi Scoring.

2. Description of Related Art

Data recognition can be useful in many areas. It allows for the automation of many routine tasks. For example, voice recognition can be employed by automated services such as telephone services which provide bank account information, airline reservations, medical information, and mail-order services. Handwriting recognition is useful for pen-based computer systems to allow ease of data entry without the need for a keyboard. Optical character recognition is useful for recognizing text in scanned documents. Additionally, pattern recognition might be employed in computer graphics, for example, to outline and then clip out a person in a picture. These audio and visual recognition uses, referred to herein as multimedia recognition uses, are numerous.

However, methods for performing data recognition present certain problems. For example, in speech recognition, matching a given acoustical observation (e.g., a digitized voice sample) to a speech recognition model may be difficult due to uncertainty and incompleteness arising from various sources such as background noise, homophones, confusable sounds, and speaker variabilities.

Stochastic modeling is one type of modeling geared towards dealing with this uncertainty and incompleteness, and it is thus particularly suited for speech recognition. Stochastic modeling in speech recognition determines the likelihood that a given acoustical observation corresponds to a given stochastic model by determining a probability for the correspondence based upon certain attributes shared by the observation and the model. One common type of stochastic model is the Hidden Markov Model (HMM).

In order to perform speech recognition using a HMM, the English language is broken down into approximately forty to fifty phonemes. These phonemes are the building blocks of the language; they are combined to form words. A stochastic model of each of the forty to fifty phonemes is created. Given an acoustical observation, the most likely phoneme corresponding to the observation can be determined.

One method for determining the most likely phoneme corresponding to the acoustical observation uses Viterbi Scoring. This method compares the acoustical observation against a stochastic model of a phoneme in order to determine a probability that this observation corresponds to that phoneme. Viterbi Scoring determines the single best state sequence, i.e., the state transition path which yields the highest probability of the observation matching the model. This same determination is performed for each of the forty to fifty phonemes of the English language. In this manner, the phoneme with the highest probability of matching the acoustical observation is determined.

If the acoustical observation includes more than one phoneme, such as a spoken word, then the above procedure can be repeated to determine a set of the most likely phonemes corresponding to the acoustical observation. Another stochastic model can then be employed repeatedly to determine a set of the most likely words corresponding to the previously-predicted phonemes. Finally, another stochastic model can be repeated to determine a set of the most likely sentences corresponding to the predicted words. This method of determining phonemes, then words, and then sentences, is called a hierarchical model representation.

However, a large amount of computing resources is required for determining a most likely phoneme for an acoustical observation. Due to these computing resources restraints, current generally-available computer systems can only determine a small amount of vocabulary in real-time. Thus, a method for more efficiently determining the probability that an observation matches a given stochastic model is desired.

SUMMARY OF THE INVENTION

The invention is an apparatus and method for determining a probability that a certain multimedia data observation corresponds to a stochastic model using Viterbi Scoring. A computer system includes a single instruction multiple data (SIMD) instruction set. For a first observation time, a first SIMD instruction is used to determine a first plurality of probabilities for the stochastic model to be in a certain set of states after transitioning via a first set of transitions. A second SIMD instruction is used to determine a second plurality of probabilities for the stochastic model to be in the same set of states after transitioning via a second set of transitions. A third SIMD instruction compares the results of the first two SIMD instructions to determine a set of intermediate probabilities representing the transition path with the higher probability. Another SIMD instruction adds one or more sets of distribution probabilities to the set of intermediate probabilities. A new way of organizing the distribution probabilities in memory enables use of the SIMD instructions. The steps are repeated for other observation times. The determinations made at the observation times are used to determine a final probability that corresponds to the probability of the observation transitioning via the most probable transition path through the stochastic model.

DETAILED DESCRIPTION

The invention is an apparatus and method for determining the best probability for matching a data sample with a stochastic model using Viterbi Scoring. In particular, one embodiment of the invention determines the probability of matching the data sample to a Hidden Markov Model (HMM). In the following detailed description, numerous specific details are set forth in order to provide a thorough understanding of the described invention. Some of these specific details need not be used to practice the invention. In other instances, well-known structures, interfaces and processes have not been shown in detail in order not to obscure the described invention. Furthermore, although the invention is described with reference to voice recognition, other embodiments of this invention can be used for other types of data recognition, such as, for example, handwriting recognition, fingerprint recognition, optical character recognition, and so forth.

Overview of the Computer System of the Invention

One area in which audio and textual data recognition can be employed is multimedia applications. Multimedia applications, as well as other advanced software applications, process large amounts of data comprising data elements that can be represented using a small number of bits.

In one embodiment, multimedia applications make use of single instruction multiple data (SIMD) instructions to take advantage of packed data formats. Packed data formats enable the processing of multiple data elements in parallel, thus speeding up the execution of software applications. Packed data formats exploit the wide data and instruction formats (usually 32 bits or wider) used by many modern microprocessors. A packed data format "packs" multiple discrete data elements into one larger data representation. For example, a 64-bit register entry which generally represents one scalar 64-bit value, may comprise four 16-bit data elements, each representing a separate value. In other words, four 16-bit data elements (or a different number of smaller or larger elements) are "packed" into one 64-bit data line.

To effectively use packed data formats, a processor supports operations which operate on packed data formats. Further, the packed data instructions cause a processor to operate on discrete data elements in parallel.

Since it is more efficient to store discrete data elements in a packed format, it is useful to manipulate several discrete data elements at the same time. One embodiment of the invention provides packed data operations as part of the microprocessor instruction set such that operations used in multimedia applications can be performed by the microprocessor on the packed data. Thus, the embodiment provides for improved multimedia application execution efficiency. Additionally, the packed data operations of the invention are general-purpose so that they can be used by a large variety of applications.

Figure 1:
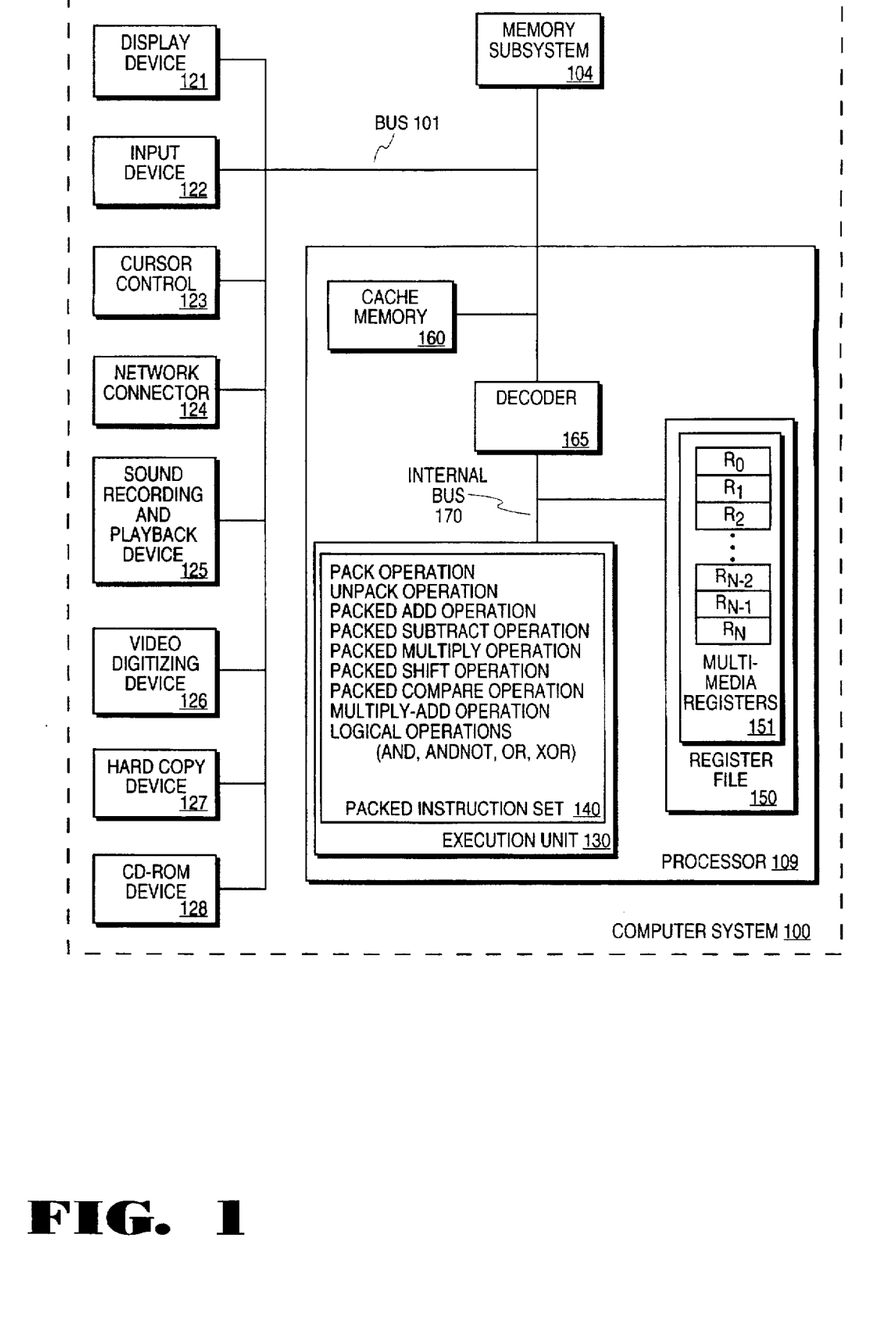
FIG. 1 shows a computer system in accordance with one embodiment of the invention.

FIG. 1 shows a computer system 100 in accordance with one embodiment of the invention. Computer system 100 comprises a bus 101 for communicating information, processor 109 coupled to bus 101 for processing information, and memory subsystem 104 coupled to bus 101 for storing information and instructions for processor 109.

Processor 109 includes an execution unit 130, a register file 150, a cache memory 160, a decoder 165, and an internal bus 170. Decoder 165, for decoding instructions, is coupled to both the execution unit 130 and the register file 150 via internal bus 170. Cache memory 160, for storing frequently and/or recently used information for processor 109, is coupled to execution unit 130. Register file 150 stores information in processor 109 and is coupled to execution unit 130 via internal bus 170. In one embodiment of the invention, register file 150 includes multimedia registers 151 for storing multimedia information. Multimedia registers 151 may be dedicated multimedia registers or registers which are used for storing multimedia information and other information. In one embodiment, multimedia registers 151 store multimedia data when performing multimedia operations and store floating point data when performing floating point operations.

Execution unit 130 operates on packed data according to the instructions received by processor 109 that are included in packed instruction set 140. Execution unit 130 also operates on scalar data according to instructions implemented in general-purpose processors. In one embodiment of the invention, processor 109 supports the Pentium ® microprocessor instruction set and the packed instruction set 140. By including packed instruction set 140 into a standard microprocessor instruction set, such as the Pentium ® microprocessor instruction set, packed data instructions can be easily incorporated into existing software (previously written for the standard microprocessor instruction set). Other standard instruction sets, such as the PowerPC™ and the Alpha™ processor instruction sets may also be used in accordance with the described invention. (Pentium ® is a registered trademark of Intel Corporation. PowerPC™ is a trademark of IBM, APPLE COMPUTER, and MOTOROLA. Alpha™ is a trademark of Digital Equipment Corporation.)

In one embodiment of the invention, packed instruction set 140 includes instructions for executing a Pack operation, an Unpack operation, a Packed Add operation, a Packed Subtract operation, a Packed Multiply operation, a Packed Shift operation, and a Packed Compare operation. Additionally, packed instruction set 140 may also include instructions for executing a Packed Multiply-Add operation and a set of packed logical operations (Packed AND, Packed ANDNOT, Packed OR, and Packed XOR operations, for example).

By including packed instruction set 140 in the instruction set of general-purpose processor 109 along with associated circuitry to execute the instructions, the operations used by many existing multimedia applications may be performed using packed data in a general-purpose processor. Thus, many multimedia applications may be executed more efficiently by using the full width of a processor's data bus for performing operations on packed data. This eliminates the need to transfer smaller units of data across the processor's data bus to perform one or more operations one data element at a time.

Still referring to FIG. 1, the computer system 100 of the invention includes a display device 121 such as a monitor. The display device 121 may include an intermediate device such as a frame buffer. The computer system 100 includes an input device 122 such as a keyboard, and a cursor control 123 such as a mouse or trackball. The display device 121, the input device 122, and the cursor control 123 are coupled to bus 101. Computer system 100 may also include a network connector 124 such that computer system 100 is part of a local area network (LAN) or a wide area network (WAN). Additionally, computer system 100 can be coupled to a device for sound recording, and/or playback 125, such as an audio digitizer coupled to a microphone for recording voice input for speech recognition. Computer system 100 may also include a video digitizing device 126 that can be used to capture video images, a hard copy device 127 such as a printer, and a CD-ROM device 128. The devices 124–128 are also coupled to bus 101.

Packed Data Formats of the Invention

In one embodiment of the invention, the execution unit 130 operates on data in several different packed data formats. For example, in one embodiment, the computer system 100 manipulates 64-bit data groups. In this embodiment, packed data can be in one of three formats: a "packed byte" format, a "packed word" format, or a "packed double-word" (dword) format. Packed data in a packed byte format includes eight separate 8-bit data elements. Packed data in a packed word format includes four separate 16-bit data elements and packed data in a packed dword format includes two separate 32-bit data elements. Examples of particular operations are discussed below with reference to one packed data format. However, the operations apply similarly to any of the packed data formats of the invention.

Additionally, many of the instructions of packed instruction set 140 can operate on signed or unsigned data and can be performed with or without "saturation". If an operation is performed using saturation, the value of the data element is clamped to a predetermined maximum or minimum value when the result of the operation exceeds the range of the data element. Exceeding the range of the data element is also referred to as data overflow or underflow. The use of saturation avoids the effects of data overflow or underflow. If the operation is performed without saturation, the data may be truncated or may indicate a data overflow or underflow in another manner.

In one embodiment, the opcodes of the instructions of packed instruction set 140 are encoded differently depending on whether they operate on signed data or unsigned data. In another embodiment, certain instructions only operate on one type of data: either unsigned or signed.

Packed Data Instructions of the Invention

Referring now to FIGS. 2–10, one embodiment of the instructions of packed instruction set 140 is described in more detail. In each example described below, Source 1, Source 2, Result and any intermediate registers are located in multimedia registers 151 (FIG. 1). In one embodiment, Result is the same register as one of the source registers. Additionally, the data in Source 1 and Source 2 registers is presumed to be packed data unless otherwise indicated. Since each operation is performed by a corresponding instruction of the same name, the use of the word operation and instruction has been used interchangeably in the following description of the packed instruction set 140.

Figure 2:
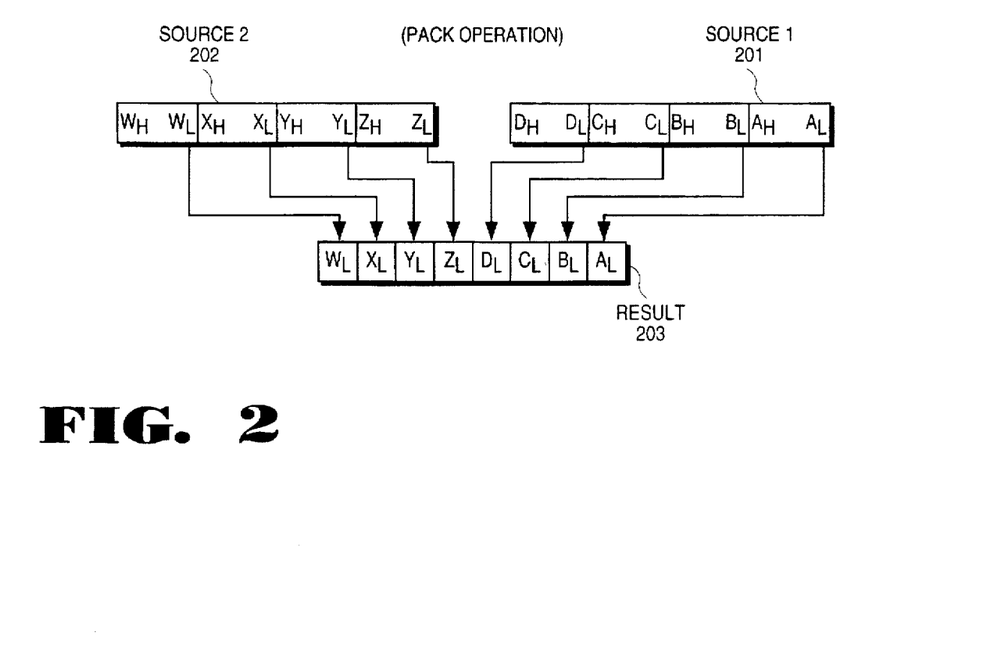
FIG. 2 illustrates one embodiment of the Pack operation.

In FIG. 2, a Pack operation is illustrated. In this example, the Pack instruction converts data from packed words into packed bytes. The low-order byte of each packed word data element in Source 1 register 201 is packed into the low-order bytes of Result register 203 as shown. The low-order byte of each packed word data element in Source 2 register 202 is packed into the high-order bytes of Result register 203 as shown. The numbers below each register identify the particular data element for purposes of illustration. In an alternate embodiment, the high-order bytes of each data element in register 201 and 202 are packed into Result register 203.

Figure 3:
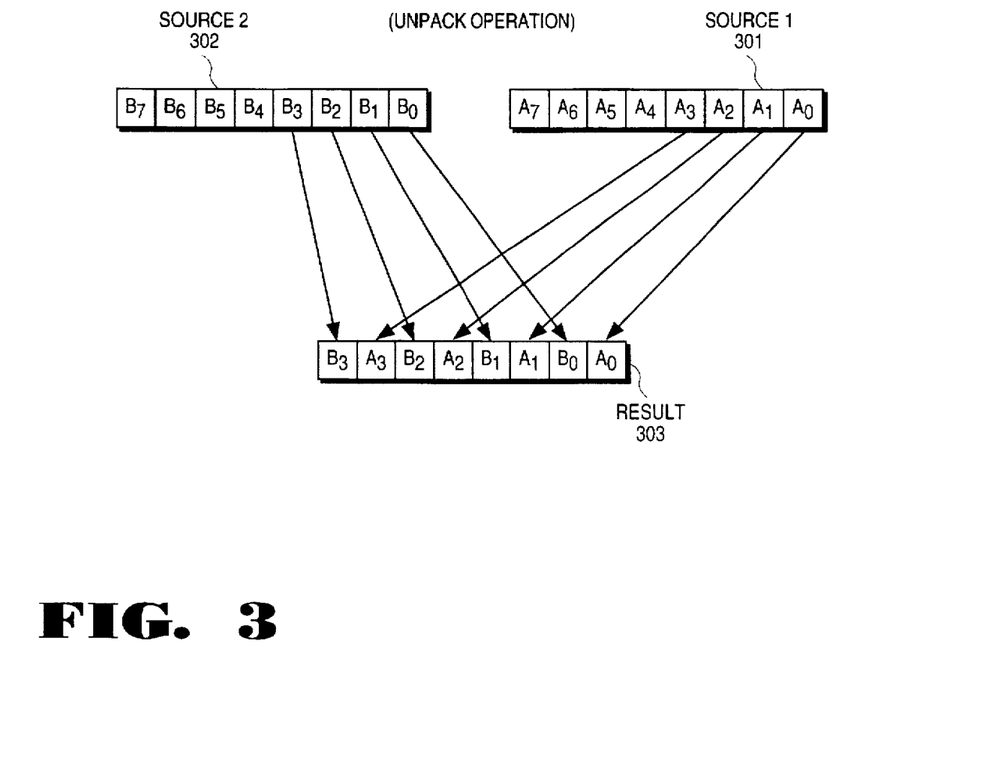
FIG. 3 illustrates one embodiment of the Unpack operation.

An example of an Unpack operation is illustrated in FIG. 3. In one embodiment, the Unpack instruction performs an interleaved unpack of the low-order data elements of Source 1 register 301 and Source 2 register 302. Thus, data element 0 of Source 1 register 301 is stored in data element 0 of Result register 303. Data element 0 of Source 2 register 302 is stored in data element 1 of Result register 303. Data element 1 of Source 1 register 301 is stored in data element 2 of Result register 303 and so forth, until all data elements of Result register 303 store data from either Source 1 register 301 or Source 2 register 302. The high-order data elements of both Source registers 301 and 302 are ignored. By choosing either Source 1 register 301 or Source 2 register 302 to be all zeroes, the Unpack may be used to unpack packed byte data elements into packed word data elements or packed word data elements into packed dword data elements.

Figure 4:
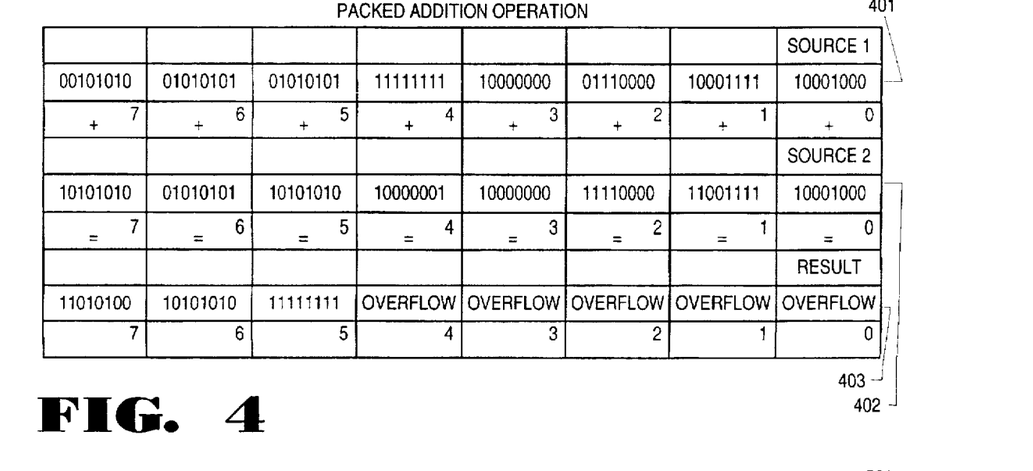
FIG. 4 illustrates one embodiment of the Packed Add operation.

FIG. 4 illustrates one embodiment of the Packed Add instruction. The packed data elements of Source 1 register 401 are added to the respective packed data elements of the Source 2 register 402. The results are placed in the respective packed data elements of the Result register 403. For example, data element 0 of Source 1 register 401 is added to data element 0 of Source 2 register 402 and the result is placed in data element 0 of Result register 403.

The Packed Subtraction operation is performed in a similar manner to the Packed Add instruction described above, but a subtraction operation is performed instead.

Figure 5:
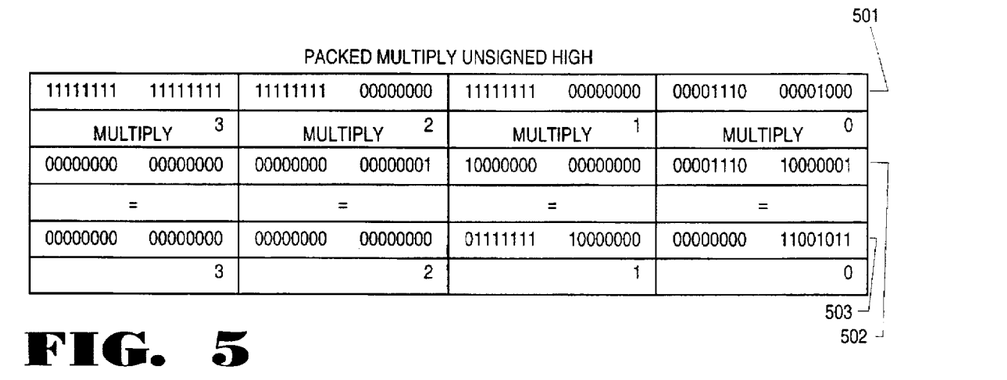
FIG. 5 illustrates an example of a Packed Multiply High operation.

The invention further includes a packed multiply operation. In one embodiment, the operation can be either a packed multiply high or a packed multiply low such that either the high-order or low-order bits of the result of the multiply are placed in the result register. FIG. 5 illustrates an example of a Packed Multiply High operation. Data element 0 of Source 1 register 501 is multiplied by data element 0 of Source 2 register 502. The high-order bits of the result of the multiplication operation are stored in Result register 503. The low-order bits of the result are ignored. A Packed Multiply Low operation is performed in a similar manner except the low-order bits of the result are stored and the high-order bits of the result are ignored.

Figure 6:
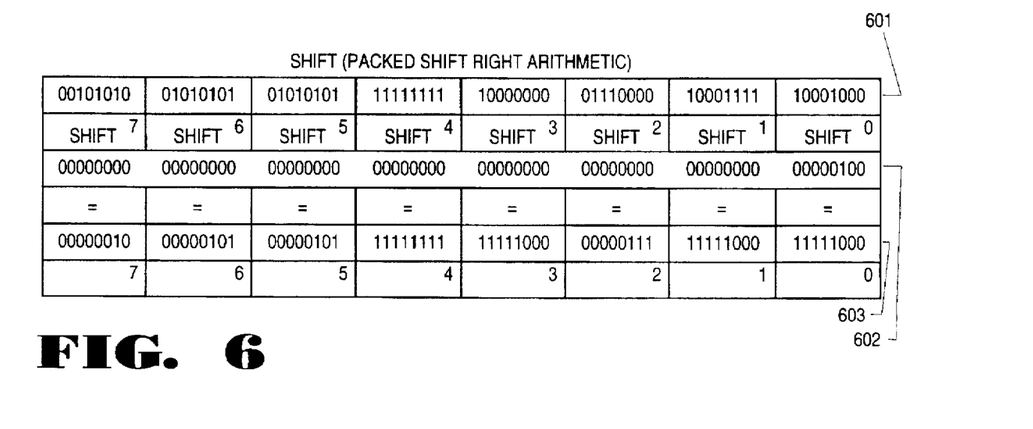
FIG. 6 illustrates an example of a Packed Shift operation.

FIG. 6 illustrates an example of a Packed Shift operation. One embodiment of the invention includes operations for shifting packed data right or left and for both arithmetic and logical shifts. The shift operation shifts the bits of an individual data element by a specified number of bits in a specified direction. Referring to FIG. 6, a Packed Shift Right Arithmetic operation is shown. Source 2 register 602 is an unsigned 64-bit scalar data element indicating the shift count. The shift count, 4 in this example, is the number of bits that each data element in Source 1 register 601 will be shifted. Each data element in Source 1 register 601 is shifted right by 4 bits. The four high-order bits left open by the shift operation are filled with the initial value of the sign bit of the respective data element. In contrast, a logical shift fills the high or low-order bits (depending on the direction of the shift) of the data element with zeroes.

In another embodiment, Source 2 register 602 contains packed data indicating shift counts for each corresponding data element in Source 1 register 601.

Figure 7:
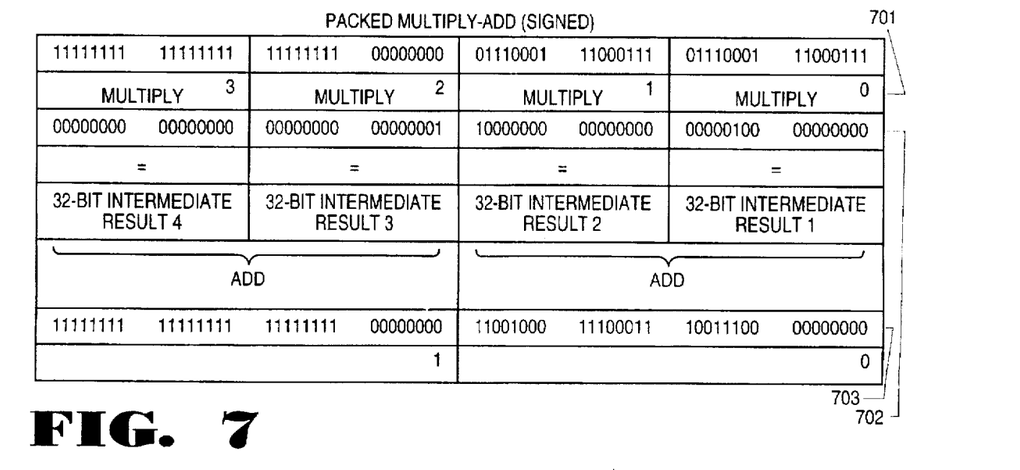
FIG. 7 illustrates an example of a Packed Multiply-Add operation.

FIG. 7 illustrates a Packed Multiply-Add operation that operates on signed data. Each data element of Source 1 register 701 is multiplied by the corresponding data element of Source 2 register 702. The intermediate results of this operation are stored in Intermediate registers 703. The intermediate results are summed by pairs as shown to generate the result of the Packed Multiply-Add operation which is stored in Result register 704. As illustrated, the data elements in Result register 704 are twice as wide as the data elements of Source 1 register 701 and Source 2 register 702.

Figure 8:
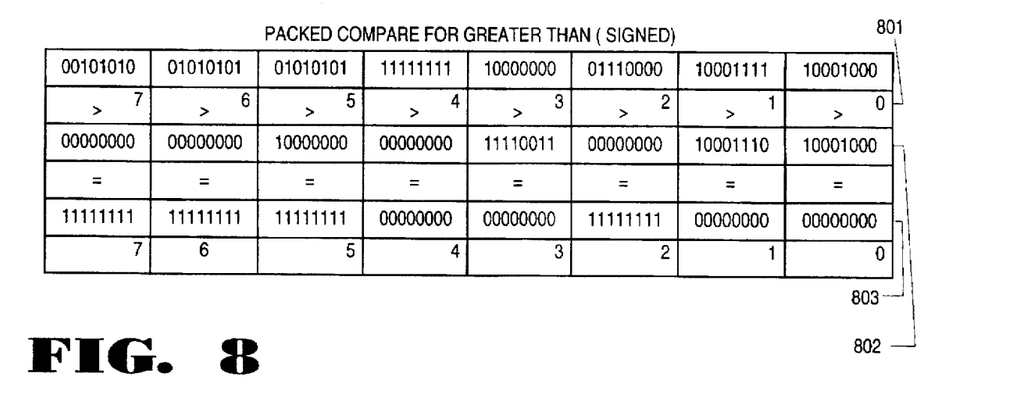
FIG. 8 illustrates a Packed Compare for Greater Than operation.

The invention also includes Packed Compare operations. One embodiment includes a Packed Compare for Equal and a Packed Compare for Greater Than operation. FIG. 8 illustrates a Packed Compare for Greater Than operation that operates on signed data. If a data element in Source 1 register 801 is greater than the corresponding data element in Source 2 register 802, then the corresponding data element of Result register 803 is set to all ones. Otherwise, the corresponding data element of Result register 803 is set to all zeroes. The Packed Compare for Equal operation operates in a similar manner, but sets a data element of Result register 803 to all ones when the corresponding data element in Source 1 register 801 is equal to the same data element in Source 2 register 802.

Figure 9:
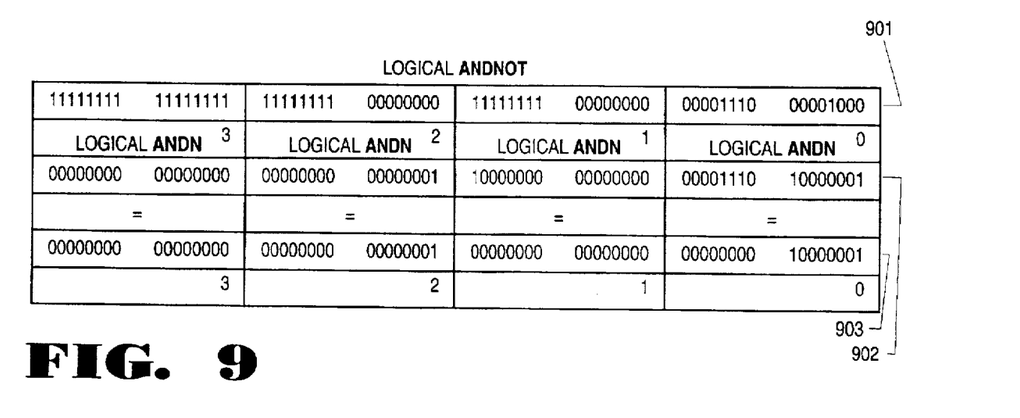
FIG. 9 illustrates an example of the operation of a Packed Logical ANDNOT operation.

One embodiment also provides several packed logical operations including AND, OR, XOR and ANDNOT. FIG. 9 illustrates an example of the operation of the Packed ANDNOT operation. The Packed ANDNOT operation is performed with individual data elements of Source 1 register 901 and Source 2 register 902 as operands. In a Packed ANDNOT operation, the data in each data element of Source 1 register 901 is inverted and then logically ANDed with the corresponding data element in Source 2 register 902. The result of the Packed ANDNOT operation is stored in the respective data element of Result register 903. Other logical operations of the invention are performed in a similar manner using the appropriate logical operation.

The Hidden Markov Model (HMM)

The entire English language can be represented by forty to fifty phonemes. These phonemes are the building blocks of the language. Phonemes are combined to form words, words are combined to form sentences, and so forth. Given an acoustical observation of spoken language, a stochastic model can be repeatedly employed to determine a set of the most likely phonemes corresponding to the acoustical observation. Another stochastic model can then be employed repeatedly to determine a set of the most likely words corresponding to the predicted phonemes. Finally, another stochastic model can be employed repeatedly to determine a set of the most likely sentences corresponding to the predicted words.

Figure 10:
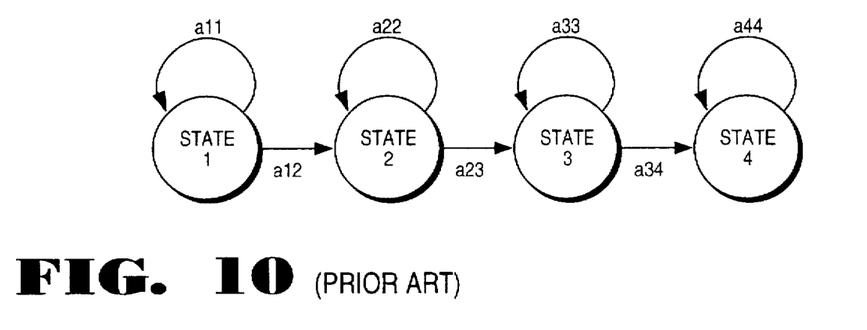
FIG. 10 shows a simple Hidden Markov Model representation of a phoneme.

FIG. 10 shows a simple Hidden Markov Model representation of a phoneme. The model is comprised of states and state transitions. Phonemes are typically represented by three or four states. Although more complex model representations of phonemes can be created, FIG. 10 shows a simple four-state model representation with states 1–4, and one-way transitions to a subsequent state. For more information on Hidden Markov Models, see for example, "Readings on Speech Recognition", edited by Alex Waibel and Kai-Fu Lee (Morgan Kaufmann Publishers, Inc., San Mateo, Calif) (1990), which is a collection of papers on speech recognition.

In FIG. 10, the Hidden Markov Model (HMM) begins in state 1. From state 1, two model transitions are possible: either there is a null transition, i.e. the model remains in state 1, or there is a transition to state 2. Along with each of these alternatives, there are transition probabilities. The probability of the model remaining in state 1 is a11, and the probability of transitioning to state 2 is a12.

Similarly, from state 2, there are two possible model transitions: either there is a null transition and the model remains in state 2, or there is a transition to state 3. Along with each of these alternatives, there are transition probabilities. The probability of the model remaining in state 2 is a22, and the probability of transitioning to state 3 is a23.

From state 3, there are also two possible model transitions: either there is a null transition, and the model remains in state 3, or there is a transition to state 4. The transition probability of the model remaining in state 3 is a33, and the transition probability of transitioning to state 4 is a34.

From state 4, the final state of this phoneme model, only the null transition is allowed. The transition probability of the model to remain in state 4 is a44.

In addition to the transition probability associated with each state of the HMM, there are also distribution probabilities associated with each state of the HMM. These distribution probabilities are based upon certain attributes (also called "features") modeled by the IMM. For example, in speech recognition, one attribute might be frequency, and another attribute might be amplitude. It is up to the creator of the model to determine which attributes to model. In handwriting recognition, for example, the attributes might include curvature of the sample handwriting, or possibly acceleration of the sample handwriting, if the sample is taken in real-time.

Table 1 (below) shows the distribution probabilities associated with each state of the HMM for a first attribute, attribute__1, of the model. In this case, attribute__1 can only assume one of ten values, or ranges of values. In Table 1, for each state of the HMM there is a distribution probability of observing one of the ten values of the attribute__1. For example, b1-1 is the probability of observing attribute$_{13}$ 1=value 1 in state 1 of this HMM; b2-1 is the probability of observing attribute__1=value 2 in state 1 of this HMM; b3-1 is the probability of observing attribute__1=value 3 in state 1 of this HMM; b4-1 is the probability of observing attribute__$_1$=value 4 in state 1 of this HMM; and so forth up to b10-1 which is the probability of observing attribute__132 value 10 in state 1 of this HMM. The summation of the probabilities b1-1 to b10-1 equals 1.

TABLE 1

|  | state 1 | state 2 | state 3 | state 4 |
|---|---|---|---|---|
| Attribute__1=value 1 | b1-1 | b1-2 | b1-3 | b1-4 |
| Attribute__1=value 2 | b2-1 | b2-2 | b2-3 | b2-4 |
| Attribute__1=value 3 | b3-1 | b3-2 | b3-3 | b3-4 |
| . | . | . | . | . |
| . | . | . | . | . |
| Attribute__1=value 10 | b10-1 | b10-2 | b10-3 | b10-4 |

Similarly, for state 2, b1-2 is the probability of observing attribute__1=value 1 in state 2 of this word; b2-2 is the probability of observing attribute__1=value 2 in state 2 of this word; b3-2 is the probability of observing attribute__1= value 3 in state 2 of this word, and so forth. The summation of the distribution probabilities b1-2 to b10-2 equals 1. Likewise, the distribution probabilities for states 3 and 4 are displayed in Table 1.

A similar table of distribution probabilities would exist for each of the other attributes modeled by the HMM.

Figure 11:
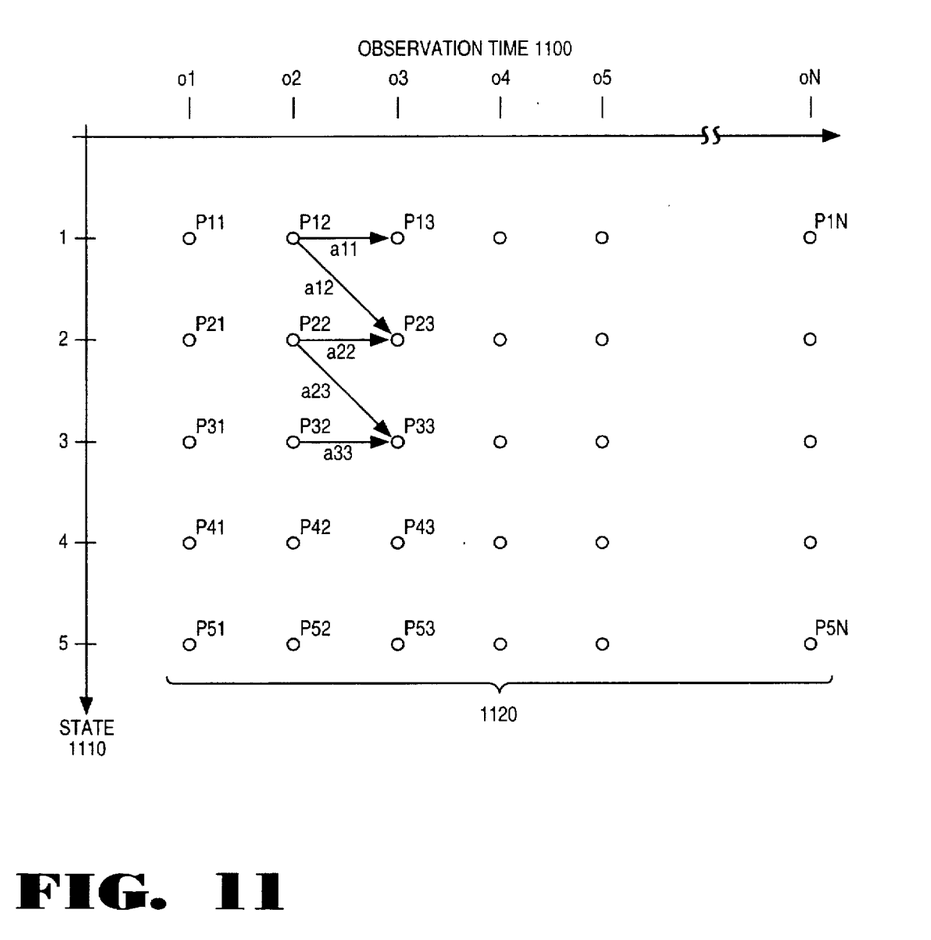
FIG. 11 shows a graphical representation of the use of Viterbi Scoring to determine the highest probability that a given acoustic observation matches a specific HMM.

FIG. 11 shows a graphical representation of the use of Viterbi Scoring to determine the highest probability that a given acoustic observation matches a specific HMM. Viterbi Scoring combines both the transition probabilities and the distribution probabilities associated with each state, described previously, to determine a final probability that an observation matches a specific HMM, represented in FIG. 11 as probability P5N.

In using Viterbi Scoring, numerous sample observation points in time, o1 to oN, are established. These observation times are picked at intervals frequent enough to only allow at most one state transition during the interval between the observation times. At each observation time the probability of the model being in a particular state is determined.

FIG. 11 shows observation times 1100 along one axis and model states 1110 along the other axis. Probability points 1120 are formed at the intersections of the observation times and the model states. The probability points indicate the probability that at an observation time, the model is in a particular state. For example, P11 is the probability that at observation time o1, the model is in state 1. P21 is the probability that at observation time o1, the model is in state 2. P31 is the probability that at observation time o1, the model is in state 3, and so forth.

Similarly, P12 is the probability that at observation time o2, the model is in state 1. P22 is the probability that at observation time o2, the model is in state 2. P32 is the probability that at observation time o2, the model is in state 3, and so forth.

Once the probabilities of being in one of the states at observation time o1, P11 to P51, is determined then the probabilities of being in a certain state at observation time o2, P12 to P52, can be determined. In determining the probability of being in a given state at observation time o2, the probability of being in the previous state in the previous observation time is multiplied by the probability of transitioning into the given state. This gives a first probability of being in the given state at the given observation time. Next, the probability of being in the given state at the previous observation time is multiplied by the probability of remaining in the given state. This gives a second probability of being in the given state at the given observation time. The higher probability arising from the first or second determination is the more probable. In the described embodiment, since only the highest probability matters, only the higher of the two determinations is used for further calculations.

Additionally, to simplify calculations, the probability determination is done on a logarithmic scale. Thus, each of the multiplications is performed by adding the probabilities instead of multiplying the probabilities since $$\log a + \log b = \log (a * b).$$

FIG. 11 employs the logarithmic scale. Thus, for example, P23, the probability of being in state 2 at observation time o3, is determined by first determing the probability of being in the previous state (state 1) at the previous observation time (o2), P12, and adding the probability of transitioning to the given state (state 2) at the given observation time (o3), a12. Then, the probability of being in the given state (state 2) at the previous observation time (o2), P22, is added to the probability of remaining in given state (state 2) at the given observation time (o3), a22. Next, the higher of the results of the two determinations yields max (P12+a12, P22+a22).

Additionally, since each state has distribution probabilities associated with it dependent upon certain attributes of the model, these probabilities must also be added to the determination. For example the distribution probabilities associated with state 2 at observation time 3 is the sum of all of the distribution probabilities associated with the model's attributes, and can be represented as Sum (b[o3,2]). Thus the highest probability of being in state 2 at observation time o3 is represented as $$P23 = max(P12+a12, P22+a22) + Sum(b[o3,2]).$$

Note that the probabilities P12 to P1N do not need to employ the maximum function since there is only one possible transition to these states. For example, $$P13 = (P12+a11) + Sum(b[o3,1]).$$

Thus, once the initial probabilities, P11 to P51, are determined, the additional probabilities can be determined as indicated above.

As is shown by FIG. 11, the determination with respect to P33 is very similar to the determination of P23. The data may be different, but the operations are the same. Determining P43 and P53 is done similarly:

$$P23 = max(P12+a12, P22+a22) + Sum(b[o3,2])$$

$$P33 = max(P22+a23, P32+a33) + Sum(b[o3,3])$$

$$P43 = max(P32+a34, P42+a44) + Sum(b[o3,4])$$

$$P53 = max(P42+a45, P52+a55) + Sum(b[o3,5]).$$

It would be more efficient if the parallelism of these determinations were exploited, for example, by determining P23, P33, P43, and P53 all at the same time. This is achievable using the packed instructions described previously.

For example, the Packed Add instruction can be used to simultaneously add a first operand comprising the data elements (P12; P22; P32; P42) with a second operand comprising the transition probability data elements (a12; a23; a34; a45). Similarly, another Packed Add instruction can add a first operand (P22; P32; P42; P52) with a second operand comprising the transition probability data elements (a22; a33; a44; a55). The Packed Add instruction maintains the independence of the four data elements while still operating on all four elements at the same time.

After the two Packed Add instructions store their results in two registers, a Packed Compare for Greater Than instruction is used to compare the two results to determine the maximum value of each of the four independent pairs of results: the first data element of the first result is compared against the first data element of the second result; the second data element of the first result is compared against the second data element of the second result; the third data element of the first result is compared against the third data element of the second result; and the fourth data element of the first result is compared against the fourth data element of the second result.

As described above, the Packed Compare for Greater Than instruction of one embodiment provides a data mask which can be used to select the maximum data values. Prior art packed compare instructions did not provide a data mask. The data mask allows for using the logical packed operations of AND, ANDNOT, and OR, to produce an operand which includes only the maximum-value elements of the original two operands which were compared. This is accomplished by performing an AND between the data mask with the first operand, then performing an ANDNOT between the data mask with the second operand. An OR operation is then performed between the result of the AND operation and the result of the ANDNOT operation. This method of using the data mask and the logical packed operations avoids the use of conditional branching. In the prior art, it was common for the compare instruction to set a branch bit, after which a conditional branch used the branch bit to determine an execution path. The different execution paths would select a different result operand. In an embodiment of the invention that uses branch prediction, by using the data mask to avoid conditional branching, performance is increased by eliminating complexities due to branch misprediction.

Subsequently, one or more Packed Add instructions can be used to add the various distribution probabilities associated with the model represented by the summations Sum (b|o3,2]), Sum (b[o3,3]), Sum (b[o3,4]), and Sum (b[o3,5]). For example, adding the probabilities for attribute__1 for each of the states could be accomplished by performing a Packed Add using an operand with data elements corresponding to the respective states (shown in parentheses):

(attribute__1(2); attribute__1(3); attribute__1(4); attribute__1(5))

A second attribute can be added using an operand with data elements corresponding to the respective states (shown in parentheses):

(attribute__2(2); attribute__2(3); attribute__2(4); attribute__2(5))

Additional attributes, or features, are added according to how many attributes are represented by the model.

In order to make use of the above described method, it is important that the distribution probability data is organized in memory such that the distribution probability data is arranged by feature value and has successive states at successive addresses in memory. For example, b[o3,3] is stored at a successive address to the storage of b[o3,2]. At subsequent addresses, b[o3,4] and b[o3,5] are stored. In other systems, distribution probability data have traditionally been organized such that successive values of a given state are in successive addresses.

Figure 12:
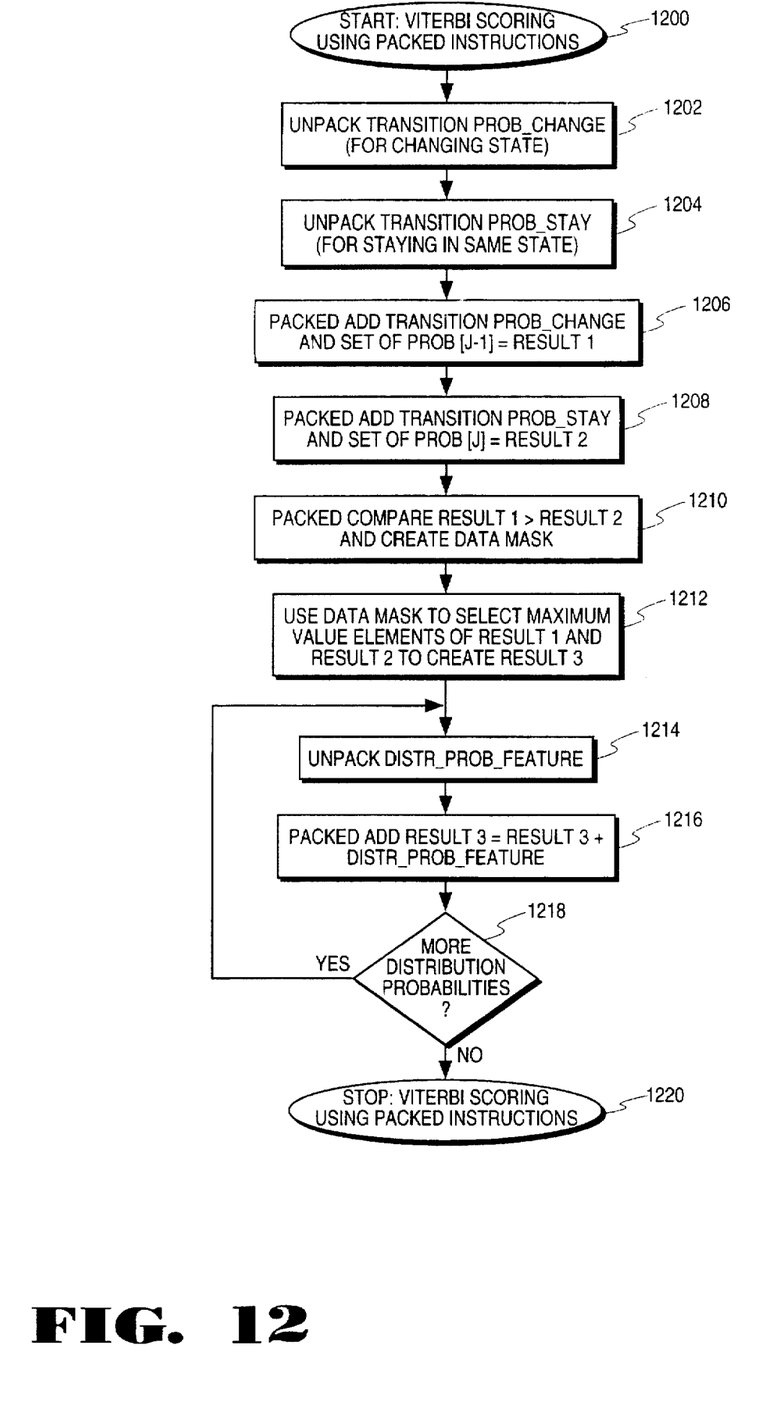
FIG. 12 is a flowchart of the steps taken in using Viterbi Scoring with packed instructions to determine the highest probability that a given acoustic observation matches a specific HMM.

FIG. 12 shows a flowchart of the steps taken in using Viterbi Scoring using packed instructions. Operation starts at a flowchart 1200. From flowchart 1200, processing transitions to blocks 1202 and 1204. At blocks 1202 and 1204, which may be executed in any order, the transition probabilities are prepared for a subsequent Packed Add instruction to be described shortly. In one embodiment of the invention, the transition probabilities are stored with 8-bit precision. In order to use these transition probabilities to determine the probabilities of being in a particular state, a higher precision is used. An Unpack instruction converts the transition probabilities to 16-bit precision. At block 1202, the transition probabilities for changing state are prepared for the subsequent Packed Add instruction. At block 1204, the transition probabilities for staying in the same state are prepared for the subsequent Packed Add instruction. From block 1204, processing continues at block 1206.

At block 1206, a Packed Add operation is performed with a set of transition probabilities for changing states and a first set of probabilities for being in a particular state. From block 1206, processing moves to block 1208, where a Packed Add operation is performed with a set of transition probabilities for staying in the same state and a second set of probabilities for being in a particular state. From block 1208, processing continues at block 1210.

At block 1210, a Packed Compare for Greater Than operation is performed between the results of the two Packed Add instructions. A data mask is created by the Packed Compare for Greater Than operation. Then processing continues at processing block 1212, where packed logical operations are performed using the data mask to create a result which has the maximum-value elements from the Packed Compare for Greater Than operation.

Processing continues at block 1214, one set of the distribution probability attributes (or features) is prepared to be combined with the result of the previous operation 1212. In one embodiment, the distribution probability attributes are stored with 8-bit precision, and the distribution probability attributes are converted to 16-bit precision in order to combine it with the result of the previous operation 1212. An Unpack operation is performed. From block 1214, processing continues at block 1216.

At block 1216, a Packed Add is performed using the set of distribution probability attributes of the operation block 1214, and the result of the Packed Compare for Greater Than of the operation block 1212. The result is accumulated such that other Packed Adds may be performed to add more sets of distribution probability attributes. From block 1216, processing continues at decision block 1218.

At the decision block 1218, a determination is made whether there are more distribution probability attributes which need to be accumulated to determine the probability of being in a particular state. If not all the distribution probability attributes have been processed, processing continues at block 1214. If there are no more distribution probability attributes, then processing ends at block 1220.

Thus, the described SIMD instructions can be employed for higher efficiency at each observation time once the initial condition probabilities are determined using non-packed instructions. The highest probability that the given observation corresponds to the stochastic model is given by the highest probability determined for the probability point at the final state and last observation point of the model. For example, in FIG. 12, the highest probability that the given observation corresponds to the stochastic model is the probability determined for probability point P5N.

Table 2 is a sample program written in 'C' showing how to set up the Viterbi Scoring determination.

TABLE 2

```
/* © 1994 Intel Corporation
 *
 * viterbi.c
 * ----------------------------------------------------------
 */
#include <stdio.h>
#include "score_cd.h"
int viterbi(observ, trans_proba, dist_proba1,
            dist_proba2, dist_proba3, dist_proba4, buffer1, buffer2)
int observ[][feature_count+1];      /* observation sequence    */
unsigned char trans_proba [];       /*transition probabilities */
unsigned char dist_proba1 [][state_count+3];  /* distribution probabilities assuming */
unsigned char dist_proba2 [][state_count+3];  /*  4 features needed for recognition  */
unsigned char dist_proba3 [][state_count+3];  /*  Note that the probabilities for    */
unsigned char dist_proba4 [][state_count+3];  /*  subsequent states are in           */
                                              /*  consecutive. addresses in          */
                                              /*  memory                             */
        int buffer1[];       /* forward recursion values   */
```

TABLE 2-continued

```
int buffer2[];      /* last forward recursion values */
{
int i;              /* Loop counter                  */
int j;              /* Loop counter                  */
int k;              /* Loop counter                  */
int t;              /* Loop counter                  */
int *tmp;
unsigned char *trans, *pt1, *pt2, *pt3, *pt4;
int max_probL;      /* temp variable used to determine max prob */
int valueL;         /* temp variable used to determine max prob */
/*
* ------------------------------------------------------------
* Initialization of first value state 1, t=1
* ------------------------------------------------------------
*/
        buffer2[0] = dist_proba1[observ[1][1]][0]
                   + dist_proba2[observ[1][2]][0]
                   + dist_proba3[observ[1][3]][0]
                   + dist_proba4[observ[1][4]][0];
/*
* ------------------------------------------------------------
* Initialization of values state > 1, t=1 to 0
* ------------------------------------------------------------
*/
for (i = 1; i < state_count; ++i)
        }
              buffer2[i] = 0;
        {
/*
*------------------------------------------------------------
* Calculation of the viterbi recursion
* ------------------------------------------------------------
*/
for(t=2; t<= observ_count; ++t)
        {
        trans = &trans_proba[0];
        pt1 = &dist_proba1[observ[t][1] ][0];
        pt2 = &dist_proba2[observ[t][2] ][0];
        pt3 = &dist_proba3[observ[t][3] ][0];
        pt4 = &dist_proba4[observ[t][4] ][0];
        buffer1[0] = buffer2[0] + *trans
                   + *pt1 + *pt2 + *pt3 + *pt4;
        for (j = 1; j < state_count; ++j)
              {
        /* stay on the same state (only choice in state 1) */
        /* *********************** */
                    trans ++;
                    max_probL = buffer2[j-1] + *trans;
        /* proba if transition from previous state */
        /* ************************************** */
        */ valueL = buffer2[j] + trans_proba[j][j]; */
                    trans ++;
                    valueL = buffer2[j] + *trans;
        /* choose max value */
        /* *************** */
                    if (valueL > max_probL)
                          max_probL = valueL;
                    buffer1[j] = max_probL ;
                    pt1 ++; pt2 ++; pt3 ++; pt4 ++;
                    buffer1[j] += *pt1 + *pt2 + *pt3 + *pt4;
              }
        /* switch buffer at end of column */
        /* ****************************** */
        tmp = buffer1;
        buffer1 = buffer2;
        buffer2 = tmp;
        /*
        for (i=1; 1<= state_count; i++)
              {
                    printf("%2d ", buffer2[i]);
                    if (i % state_count == 0)
                          printf("\n");
              }
        */
        }              /* end of main loop over index t */
        retune(buffer2[state_count-1]);
}
```

Table 3 shows an assembly language listing of the sample program using non-packed data instructions only.

TABLE 3

```
/* © 1994 Intel Corporation
*/
.align    16
          / Hand Optimized Inner loop
          / ----------------------
          / dist 1 is the distribution probability of feature_1
          / dist 2 is the distribution probability of feature_2
          / dist 3 is the distribution probability of feature_3
          / dist 4 is the distribution probability of feature_4
          /
          / Register Utilization
          /    ebp = address of trans_proba
          /    ebx = loop index j
          /    esi = address of dist2
          /    edi = address of dist4
          /    ecx = accumulator
.B1.9:
          xorl    %eax, %eax
          movl    20(%esp), %edx        / get address of buffer2
          movb    2(%ebp), %al          / load trans_proba[j]
          xorl    %ecx, %ecx
          addl    (%edx,%ebx,4), %eax   /load buffer2[j]
          movb    1(%ebp), %cl          / load trans_proba[j-1]
          addl    -4(%edx,%ebx,4), %ecx
          addl    $2, %ebp
          cmpl    %ecx, %eax            / max
          jle     .B1.11
.B1.10:
          movl    %eax, %ecx
.B1.11:
          movl    40(%esp), %edx        / load address of dist1
          xorl    %eax, %eax
          movb    1(%edx), %al          / load dist1
          incl    %edx                  / address of dist1 ++
          addl    %eax, %ecx            / accumulate
          movl    %edx, 40(%esp)        / store address of dist1
          movb    1(%esi), %al          / load dist2
          movl    36(%esp), %edx        / load address of dist3
          addl    %eax, %ecx            / accumulate
          movb    1(%edx), %al          / load dist3
          incl    %edx                  / address of dist3 ++
          addl    %eax, %ecx            / accumulate
          movl    %edx, 36(%esp)        / store address of dist3
          movb    1(%edi), %al          / load dist4
          incl    %esi                  / address of dist2 ++
          addl    %eax, %ecx            / accumulate
          movl    200+20(%esp), %eax    / load jmax
          incl    %edi                  / address of dist4 ++
          movl    24(%esp), %edx        / load buffer1 address
          movl    %ecx, (%edx,%ebx,4)   / store result
          incl    %ebx                  /j++
          cmpl    %eax, %ebx
          jle     .B1.9
```

Table 4 shows an assembly language listing of the program using packed instructions along with non-packed instructions for improving efficiency. Simulations running the assembly code of Table 4 shows an approximate three-fold execution speed improvement over the assembly code of Table 3, using a simulation with more than fifty observation points, nine states, and four attributes (or features).

TABLE 4

```
/* © 1994 Intel Corporation
*/
/* SIMD code for viterbi.c for inner loop
/*
/* Register allocation:
/* eax row address of dist1, the distribution probability of feature_1
/* ebx row address of dist2, the distribution probability of feature_2
/* ecx address of buffer1
/* edx address of buffer2
```

TABLE 4-continued

```
/* edi address of trans_stay and trans_change (transition probabilities)
/* esi row address of dist3 and dist4, distr. probs. of features 3 & 4
/* ebp loop count
/*
/* r0, r1, r2, r3, r4, r5, r6, r7 working registers
/*    r0 is used as the accumulator of the probability sum
/*    r7 is used as a temporary register holding the value zero to
/*       unpack bytes into words for accumulation
/* 4 values are computed per iteration
/*
/* ***********************************************
*/
loop_over_j:
          movl    tchange(%esp), %edi      / load address of trans_change
          xor     r7,r7                    / zero r7
          movl    0(%edi), r1              / load trans_change
          add     $4, %edi
          movl    %edi, tchange(%esp)
          unpack  r7, r1
          movq    (%edx, %ebp, 2), r5      / load buffer2[j]
          movq    (%edx, %ebp, 0), r0      / load buffer2[j-1]
          padd    r1, r0                   / buffer2[j-1] + trans_change
          movl    tstay(%esp), %edi        / load address of trans_stay
          movl    2(%edi), r2              / load trans_stay
          unpack  r7, r2
          add     $4, %edi
          movl    %edi, tstay(%esp)
          padd    r5, r2                   / buffer2[j] + trans_stay
                                           / Take the max of r0 or r2
          or      r2, r7                   / copy r2 into r7
          pcmpgt  r0, r2                   / create comparison mask
          pand    r2, r0
          pandnot r2, r7
          por     r7, r0                   / or two results
          xor     r7,r7                    / zero r7
          movl    2(%eax),r6               / load dist1
          unpack  r7, r6
          addl    $4, %eax
          padd    r6, r0                   / accumulate
          movl    2(%ebx), r2              / load dist2
          unpack  r7, r2
          addl    $4, %ebx
          padd    r2, r0                   / accumulate
          movl    2(%esi), r3              / load dis3
          unpack  r7, r3
          addl    $4, %esi
          movl    %esi, tmp3(%esp)
          padd    r3, r0                   / accumulate
          movl    tmp4(%esp) %esi          / load current row address of dist4
          movl    2(%esi), r4              / load dist4
          addl    $4, %esi
          unpack  r7, r4
          movl    %esi, tmp4(%esp)
          padd    r4, r0                   / accumulate
          movl    jmax(%esp), %esi
          movq    r0, (%ecx, %ebp, 2)      / store result
          addl    $4, %ebp                 / decrement loop count
          cmp     %ebp, %esi
          movl    tmp3(%esp) %esi          / restore row address of dist3
          jle     loop_over_j
```

The Hierarchical HMM

In a hierarchical speech recognition implementation, once the phonemes are predicted as described above, another stochastic model, or more particularly, another HMM, can be used to determine the highest probability that the predicted phonemes correspond to a particular word. In this case, a HMM is created which is similar to FIG. 10. Although the model may have a different number of states from FIG. 10, the model is substantially the same. For example, a five state model will have five states. It will start at state 1, and end at state 5. From each state there are two transitions allowed, except for the last state, in which only one transition is allowed. Again, each transition is associated with a transition probability.

Table 5 (below) shows the distribution probabilities associated with each state of the Hidden Markov word model.

For each state of the HMM there is a distribution probability of observing one of the 40 phonemes. (For simplification, we are assuming that there are only 40 phonemes in this model.) For example, b1-1 is the probability of observing phoneme 1 in state 1 of this HMM; b2-1 is the probability of observing phoneme 2 in state 1 of this HMM; b3-1 is the probability of observing phoneme 3 in state 1 of this HMM; b4-1 is the probability of observing phoneme 4 in state 1 of this HMM; and so forth up to b40-1 which is the probability of observing phoneme 40 in state 1 of this HMM. The summation of the probabilities b1-1 to b40-1 equals 1.

TABLE 5

|            | state 1 | state 2 | state 3 | state 4 | state 5 |
|------------|---------|---------|---------|---------|---------|
| Phoneme 1  | b1-1    | b1-2    | b1-3    | b1-4    | b1-5    |
| Phoneme 2  | b2-1    | b2-2    | b2-3    | b2-4    | b2-5    |
| Phoneme 3  | b3-1    | b3-2    | b3-3    | b3-4    | b3-5    |
| .          | .       | .       | .       | .       | .       |
| .          | .       | .       | .       | .       | .       |
| .          | .       | .       | .       | .       | .       |
| Phoneme 40 | b40-1   | b40-2   | b40-3   | b40-4   | b40-5   |

Similarly, for state 2, b1-2 is the probability of observing phoneme 1 in state 2 of this word; b2-2 is the probability of observing phoneme 2 in state 2 of this word; b3-2 is the probability of observing phoneme 3 in state 2 of this word, and so forth. The summation of the distribution probabilities b1-2 to b40-2 equals 1. Likewise, the distribution probabilities for states 3, 4, and 5 are displayed in Table 5.

Once again, Viterbi Scoring, similar to that described with reference to FIG. 11, can be used on the word model. However, in this hierarchical model, instead of determining the highest likelihood of a phoneme matching the HMM, the highest likelihood of a word matching the HMM is determined. Subsequently, this process could be repeated once again to determine the highest likelihood of a sentence matching the HMM.

Thus, an apparatus and method for determining the best probability for matching a data sample with a stochastic model using Viterbi Scoring is disclosed. The specific arrangements and methods described herein are merely illustrative of the principles of this invention. Numerous modifications in form and detail may be made without departing from the scope of the described invention. Although this invention has been shown in relation to a particular embodiment, it should not be considered so limited. Rather, the described invention is limited only by the scope of the appended claims.

What is claimed is:

1. A method used in determining an output probability that an input set of data matches a stochastic model, the stochastic model including a plurality of states, the method comprising the steps of:

(a) using an SIMD pack instruction to convert a plurality of data elements into a first packed format;

(b) using a first SIMD packed add instruction to determine a first plurality of probabilities for the stochastic model to be in a set of states after transitioning via a first set of transitions, wherein said first plurality of probabilities is represented by a first data set of said plurality of data elements, and said first set of transitions is represented by a second data set of said plurality of data elements;

(c) using a second SIMD packed add instruction to determine a second plurality of probabilities for the stochastic model to be in the set of states after transitioning via a second set of transitions, wherein said second plurality of probabilities is represented by a third data set of said plurality of data elements, and said second set of transitions is represented by a fourth data set of said plurality of data elements;

(d) generating a data mask from comparing the first plurality of probabilities to the second plurality of probabilities responsive to a single compare instruction; and (e) logically combining the data mask with the first plurality of probabilities and the second plurality of probabilities to generate a third set of probabilities.

2. The method of claim 1 wherein the step (e) further comprises the steps of:

(i) performing a logical AND of the data mask with one of the set of the first plurality of probabilities or the second plurality of probabilities;

(ii) performing a logical ANDNOT of the data mask with the other of the set of the first plurality of probabilities or the second plurality of probabilities; and (iii) logically ORing the results of steps (i) and (ii).

3. The method of claim 1 further comprising the steps of:

(f) adding one or more distribution probabilities to the third set of probabilities of step (e).

4. The method of claim 3 further comprising the steps of:

(g) repeating steps (a) to (f) at a plurality of observation times.

5. The method of claim 4 further comprising the steps of:

(h) determining a final probability of the stochastic model matching the input set of data.

6. The method of claim 3 wherein the one or more distribution probabilities are converted into a higher precision prior to adding them to the third set of probabilities in the step (f).

7. The method of claim 3 wherein the one or more distribution probabilities are stored by an attribute in a memory, and wherein said one or more distribution probabilities are stored in successive addresses in said memory.

8. The method of claim 3 wherein the one or more distribution probabilities are stored in a packed format using said pack SIMD instruction, with the one or more distribution probabilities corresponding to successive states of the stochastic model at successive addresses in a memory.

9. The method of claim 8 wherein the distribution probabilities are stored by phoneme attribute data.

10. The method of claim 1 wherein the stochastic model is a speech recognition model, the input set of data includes phoneme attribute data, and the output probability indicates a probability that the phoneme attribute data matches the speech recognition model.

11. A method used in determining an output probability that an input set of data matches a stochastic model, the stochastic model including a plurality of states, each state having a distribution probability associated with it, the method comprising the steps of:

(a) formatting data representing a first plurality of probabilities, a second plurality of probabilities, a first set of transitions, and a second set of transitions into a first data format using an SIMD pack instruction;

(b) using a first SIMD packed add instruction to determine a first plurality of probabilities for the stochastic model to be in a set of states after transitioning via a first set of transitions;

(c) using a second SIMD packed add instruction to determine a second plurality of probabilities for the stochastic model to be in the set of states after transitioning via a second set of transitions;

(d) generating a data mask by comparing the first plurality of probabilities with the second plurality of probabilities and using the data mask to generate a third plurality of probabilities;

(e) retrieving a first set of distribution probabilities from a memory, the first set of distribution probabilities previously stored by attribute; and (f) using said SIMD packed add instruction to add the first set of distribution probabilities to the third plurality of probabilities.

12. The method of claim 11 wherein the step (d) further comprises the steps of:

(i) performing a logical AND of the data mask with one of the set of the first plurality of probabilities or the second plurality of probabilities, using a packed AND instruction;

(ii) performing a logical ANDNOT of the data mask with the other of the set of the first plurality of probabilities or the second plurality of probabilities, using a packed ANDNOT instruction; and (iii) logically ORing the results of steps (i) and (ii) using a packed OR instruction.

13. The method of claim 11 further comprising the steps of:

(g) determining a final probability of the stochastic model matching the input set of data.

14. The method of claim 13 further comprising the steps of:

(h) determining a final probability of the stochastic model matching the input set of data.

15. The method of claim 11 wherein the one or more of the distribution probabilities are converted into a higher precision prior to adding them to the third plurality of probabilities in the step (f), using an SIMD unpack instruction.

16. The method of claim 11 wherein the distribution probabilities are stored in a packed format using said SIMD pack instruction, with the distribution probabilities corresponding to successive states of the stochastic model at successive addresses in the memory.

17. The method of claim 16 wherein the distribution probabilities are stored by phoneme attribute data.

18. The method of claim 11 wherein the stochastic model is a speech recognition model, the input set of data includes phoneme attribute data, and the output probability indicates a probability that the phoneme attribute data matches the speech recognition model.

19. A method of recognizing an acoustic observation as one of a plurality of reference patterns each having a time frame sequence of acoustic attributes comprising the computer-implemented steps of:

(a) formatting a first set of probabilities, a second set of probabilities, a first set of transition probabilities, and a second set of transition probabilities in a first data format using an SIMD pack instruction;

(b) retrieving said first set of probabilities, the first set of probabilities indicating a probability of being in a first set of states at a first observation time;

(c) retrieving said second set of probabilities, the second set of probabilities indicating a probability of being in a second set of states at the first observation time;

(d) retrieving said first set of transition probabilities, the first set of transition probabilities being in a packed data format;

(e) retrieving said second set of transition probabilities, the second set of transition probabilities being in the packed data format;

(f) adding in parallel, in response to executing a first SIMD packed add instruction, the first set of probabilities to the first set of transition probabilities to arrive at a first set of probability results;

(g) adding in parallel, in response to executing a second SIMD packed add instruction, the second set of probabilities to the second set of transition probabilities to arrive at a second set of probability results;

(h) generating a data mask upon comparing the first set of probability results to the second set of probability results; and (i) logically combining the data mask with the first and second probability results to generate a third set of probability results.

20. A method of employing Viterbi scoring to recognize an acoustic observation as one of a plurality of reference patterns each having a time frame sequence of acoustic attributes comprising the computer-implemented steps of:

(a) formatting a first set of state probabilities, a second set of state probabilities, a first set of transition probabilities, and a second set of transition probabilities in a first data format using an SIMD pack instruction;

(b) performing a first SIMD packed add operation on said first set of state probabilities and said first set of transition probabilities to arrive at a first set of probability results;

(c) performing a second SIMD packed add operation on said second set of state probabilities and said second set of transition probabilities to arrive at a second set of probability results;

(d) generating a data mask upon comparing the first set of probability results to the second set of probability results, using an SIMD packed compare instruction;

(e) logically combining the data mask with the first and second set of probability results to generate a third set of probability results; and (f) adding one or more sets of distribution probabilities to the third set of probability results, using said SIMD packed add instruction, the one or more sets of distribution probabilities having been previously stored by attribute in successive locations in a memory.

21. The method of claim 20 further comprising the step of:

(g) repeating steps (a) to (f) at a plurality of observation times.

* * * * *